United States Patent [19]

Borchard

[11] Patent Number: 4,862,978
[45] Date of Patent: Sep. 5, 1989

[54] COMBINATION DUST COVER AND AIR SCREEN

[76] Inventor: John S. Borchard, 36 Whitney Tavern Rd., Weston, Mass. 02193

[21] Appl. No.: 309,183

[22] Filed: Feb. 13, 1989

Related U.S. Application Data

[62] Division of Ser. No. 188,538, Apr. 29, 1988.

[51] Int. Cl.$^4$ ............................................. G01G 21/28
[52] U.S. Cl. ..................................... 177/180; 177/238
[58] Field of Search ........................ 177/126, 180–182, 177/238

[56] References Cited

U.S. PATENT DOCUMENTS

| | | | |
|---|---|---|---|
| 4,762,190 | 8/1988 | Meixner | 177/181 |
| 4,789,034 | 12/1988 | Luchinger et al. | 177/181 |
| 4,798,250 | 1/1989 | Knothe et al. | 177/181 |

FOREIGN PATENT DOCUMENTS 1100342  1/1968  United Kingdom ............... 177/126

Primary Examiner—George H. Miller, Jr.
Attorney, Agent, or Firm—John P. McGonagle

[57] ABSTRACT

A hinged dust cover used in combination with an electronic balance whereby the cover converts to an air screen during weighing operations. In the fully closed position the cover protects the weighing pan and various controls and displays from the ingress of dust and other contaminants as well as inadvertent operation. In the fully open position full access by the balance's operator is available to the weighing pan and controls. In the cover's intermediate position, the cover forms an enclosure about the weighing pan thereby isolating the weighing pan and mass being weighed from dust and air movement while at the same time making the various controls fully available to the balance's operator.

8 Claims, 7 Drawing Sheets

COMBINATION DUST COVER AND AIR SCREEN

CROSS-REFERENCE

This is a division of Ser. No. 188,538, filed 4/29/88.

BACKGROUND OF THE INVENTION

This invention relates to hinged covers, and more particularly to a hinged cover which may be converted to an air screen.

In load cells and electronic balances used for measuring very light forces and masses, i.e., to 0.01 carat, especially of the type disclosed in my U. S. Pat. No. 4,738,324, dated Apr. 19, 1988, for a Self-Adjusting Weighing System, factors such as dust and the movement of air against and across the weighing pan can introduce significant error into the calculated weight of the force or mass being measured.

SUMMARY OF THE INVENTION

The present invention is directed to a hinged dust cover which may be converted to an air screen during the weighing operation. In the fully closed position the cover protects the weighing pan and various controls and displays from the ingress of dust and other contaminants, and also prevents inadvertent operation of the balance's keyboard. In the fully open position full access by the balance's operator is available to the weighing pan and controls. In the cover's intermediate position the cover forms an enclosure about the weighing pan thereby isolating the weighing pan and mass being weighed from dust and air movement while leaving the balance's keyboard and display fully accessible to the balance's operator.

Various advantages and features of novelty which characterize the invention are pointed out with particularity in the claims annexed hereto and forming a part hereof. However, for a better understanding of the invention, its advantages and objectives obtained by its use, reference should be had to the drawings which form a further part hereof, and to the accompanying descriptive matter, in which there is illustrated and described two preferred embodiments of the invention.

DETAILED DESCRIPTION OF THE INVENTION

Figure 1:
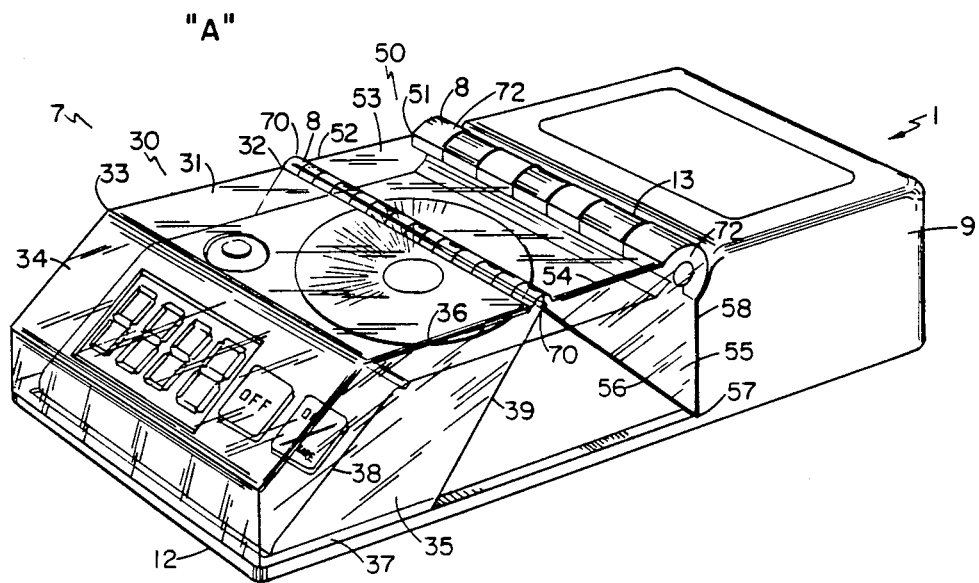
FIG. 1 shows a perspective view of a fully closed combination dust cover and air screen constructed in accordance with one the instant invention.

Referring to the drawings in detail wherein like numerals indicate like elements, reference numeral 1 refers generally to an electronic balance enclosed within a casing 9, the top front half of which has a transparent dust cover 7 which constitutes a preferred embodiment of the instant invention. The electronic balance 1 used in this application for expository purposes is a self-contained scale for accurately measuring the weight of very light masses 2, such as gems. The casing front 11 is shaped at a forty-five degree angle from the casing bottom 12 back to the casing top 13. The casing front 11 contains four LCD digits 6 which form a LCD display 5. The casing front 11 also contains a simple keyboard 15 for inputting various control functions. The scale 1 provides a digital reading on the LCD display 5 of the weight of the mass 2 being weighed. When the cover 7 is in the fully open position C, a weighing pan 20 is exposed upon which the mass 2 to be weighed is placed. The plane of the pan 20 is slightly below the casing top 13 so that the cover 7 may be in a fully closed position A without touching the pan 20. Also externally visible in the casing top 13 just forward and to the side of the pan 20 is a small, generally cylindrical, shallow cavity 14 for holding a calibration weight 22. The cavity 14 is deep enough so that the top of the stored calibration weight 22 does not interfere with the cover 7 when closed in position A. The design of the cover's hinges 8 permits the cover 7 to be set-up over the pan 20 in a partially closed position while the weighing operation takes place. This position is the cover's intermediate position B and eliminates errors in the measured value of the mass's weight from air motion.

Figure 2:
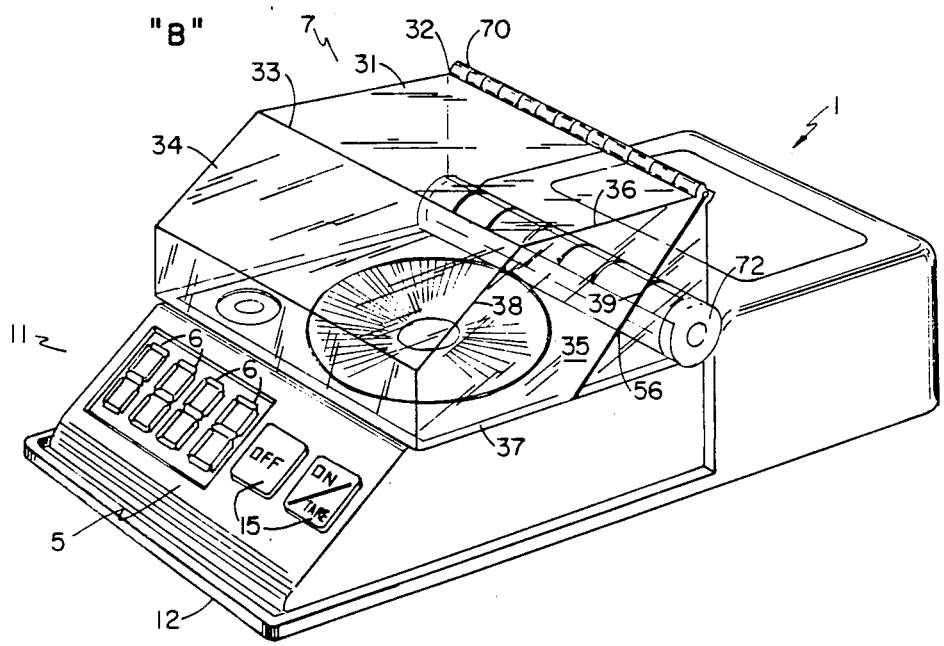
FIG. 2 shows a perspective view of the invention embodiment of FIG. 1 in the intermediate position.
Figure 3:
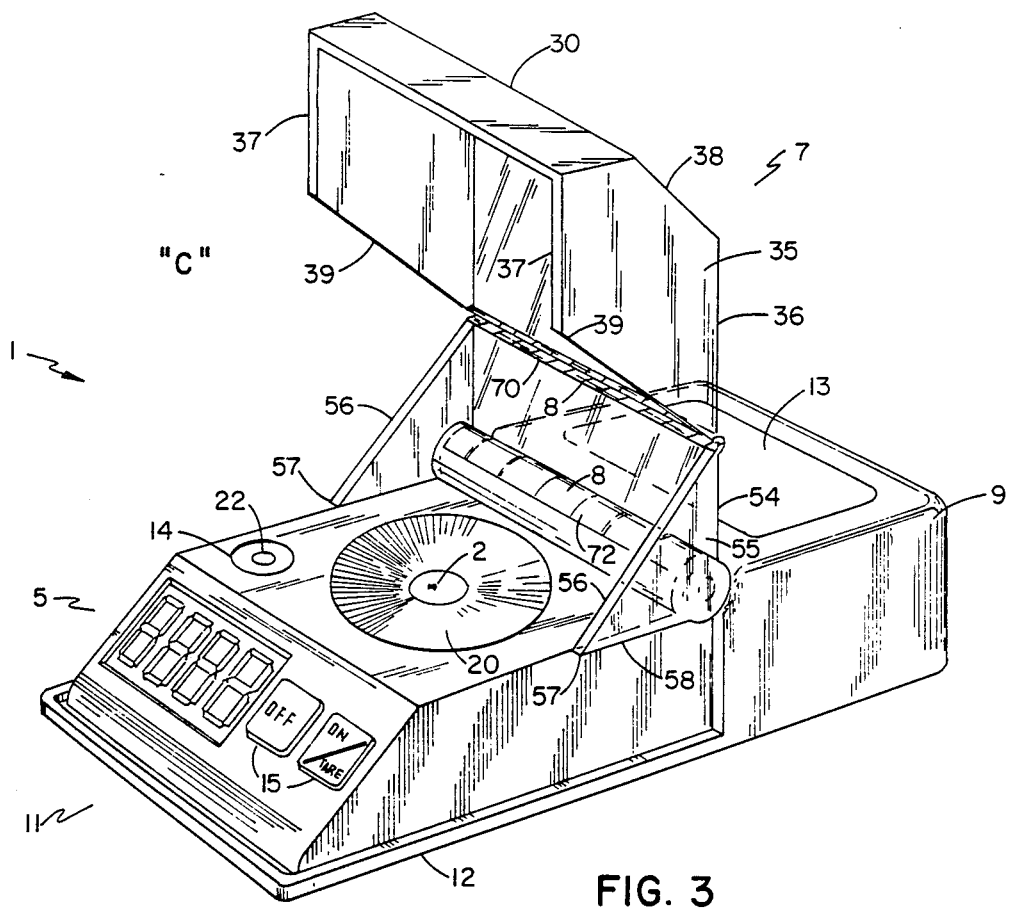
FIG. 3 shows a perspective view of the invention embodiment of FIG. 1 the fully open position.
Figure 4:
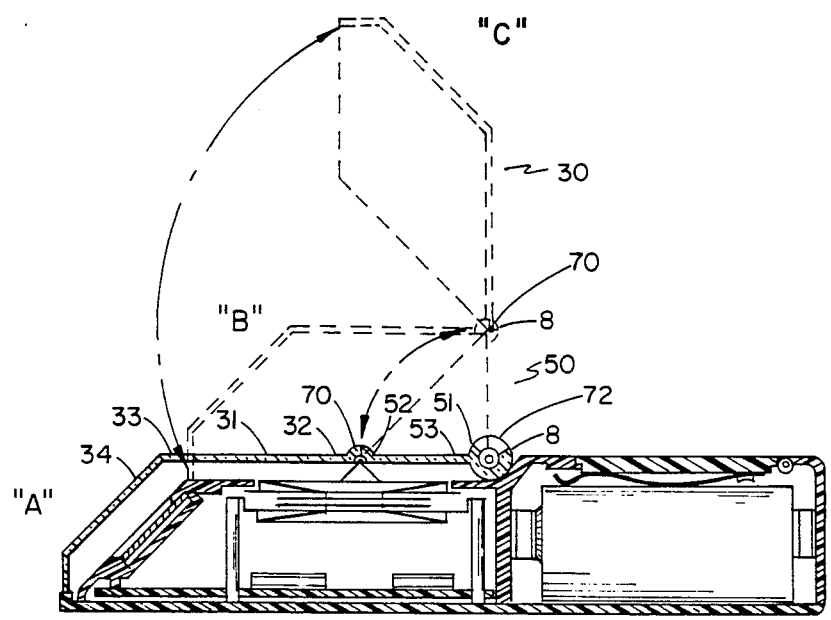
FIG. 4 shows a cross-sectional side view of the invention embodiment of FIGS. 1, 2 and 3.
Figure 5:
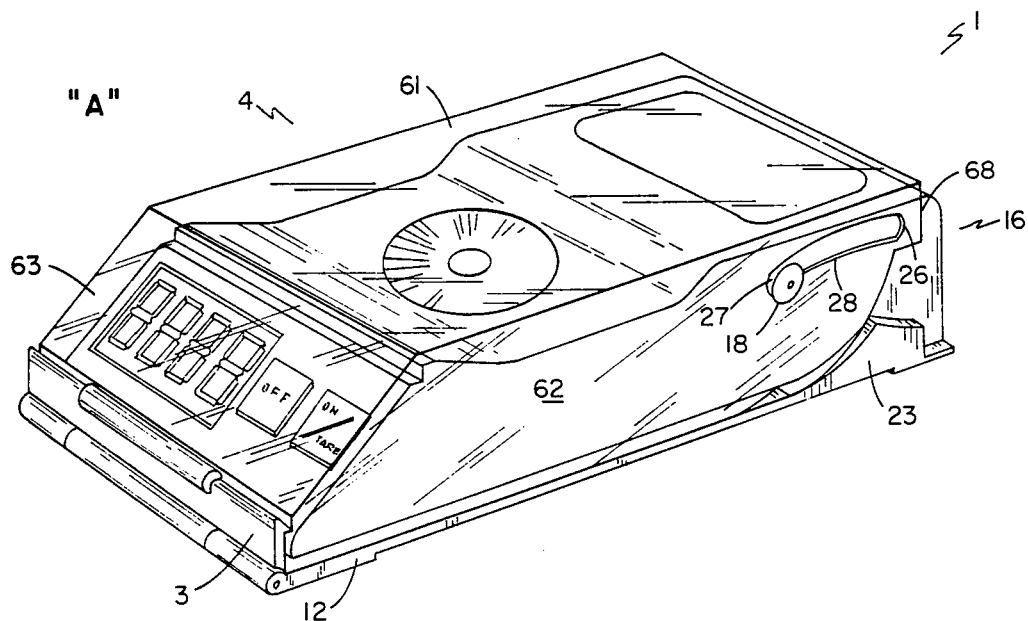
FIG. 5 shows a perspective view of another embodiment of the present invention in a fully closed position.

The cover 7 in the embodiment illustrated in FIGS. 1–5 is comprised of two sections: a forward section 30 and a rearward section 50. One of the hinges 8 interconnects the forward section 30 to the rearward section 50, i.e., the intermediate hinge 70. A second hinge 8, the connecting hinge 72, positioned along the back edge 51 of the rearward section 50, joins the cover 7 to the casing top 13. The cover's rearward section 50 is comprised of a flat, generally rectangular face 53 hinged along its front edge 52 with the intermediate hinge 70 and along its back edge 51 with the connecting hinge 72 and lying in a plane generally parallel to the plane of the casing top 13. The face's side edges 54 have downwardly protruding triangular sides 55. In this embodiment of the invention, the sides 55-are formed into right triangles. The hypotenuse 56 of each side 55 begins at the intermediate hinge 70 and extends downwardly and rearwardly to a point 57 below the connecting hinge 72. Each side edge 54 of the face 53 forms the base edge of each triangle and the triangle edge 58 extending vertically downward from the connecting hinge 72 to the point 57 forms the third edge of the triangle 55.

The cover's forward section 30 is made up of a flat, generally rectangular rearward face 31 hinged along the face's back edge 32 by means of the intermediate hinge 70 to the rearward section's front edge 52, a front portion 34 extending downwardly and forwardly at an approximate forty-five degree angle from the face's front edge 33, and two downwardly extending sides 35. The sides 35 are generally shaped like a parallelogram whereby the top horizontal edges 36 are the side edges of the rearward face 31. The bottom horizontal edges 37 of the sides 35 are in the same horizontal lines as the rearward section's backward points 57. The forward edges of the sides 35 are the side edges 38 of the front portion 34. The rearward cover section's side hypotenuse edges 56 and the forward cover section's side rearward edges 39 form a ninety degree angle at the intermediate hinge 70.

When the cover 7 is in the fully closed position A, the forward cover section's rearward face 31 and the rearward cover section's face 53 lie in the same horizontal plane. The weighing pan 20, cavity 14, calibration weight 22, LCD display 5 and keyboard 15 are enclosed by the cover 7. When the cover 7 is in the fully open position C, the forward cover section's rearward face 31 and the rearward cover section's face 53 are positioned in the same vertical plane. The only hinge 8 operation is with the connecting hinge 72. The weighing pan 20, cavity 14, calibration weight 22, LCD display 5 and keyboard 15 are fully exposed to the ambient air. When the cover 7 is in the intermediate position B, the weighing pan 20, cavity 14 and calibration weight 22 are enclosed by the cover 7, and the LCD display 5 and keyboard 15 are fully exposed. The forward cover section's rearward face 31 lies in a horizontal plane and becomes the top of the cover 7. The rearward cover section's face 53 lies in a vertical plane perpendicular to the horizontal plane of the forward cover section's rearward face 31. The rearward cover section's face 53 becomes the back side of the cover 7. To place the cover 7 in its intermediate position B, a double hinge 8 action takes place. The connecting hinge 72 is operated as it would be to place the cover 7 in the fully open position C, but the intermediate hinge 70 is then operated to put the forward cover section 30 back down. The forward cover section's front port,:on 34 forms the cover's front side. The forward cover section sides 35 and the rearward cover section sides 55 fit together to form air tight sides for the cover 7 when it is in the intermediate position B. The cover 7 thereby becomes an air screen and isolates the weighing operation from ambient air movement which could distort the calculated weight of the mass 2 being weighed.

Figure 6:
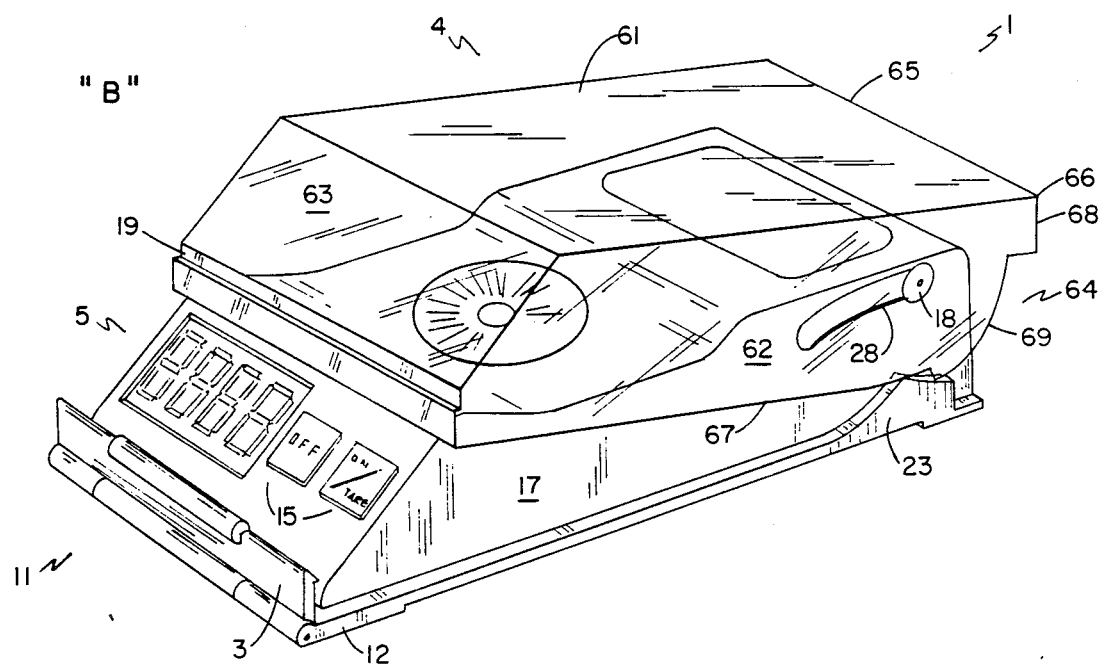
FIG. 6 shows a perspective view of the invention embodiment of FIG. 5 in the intermediate position.
Figure 7:
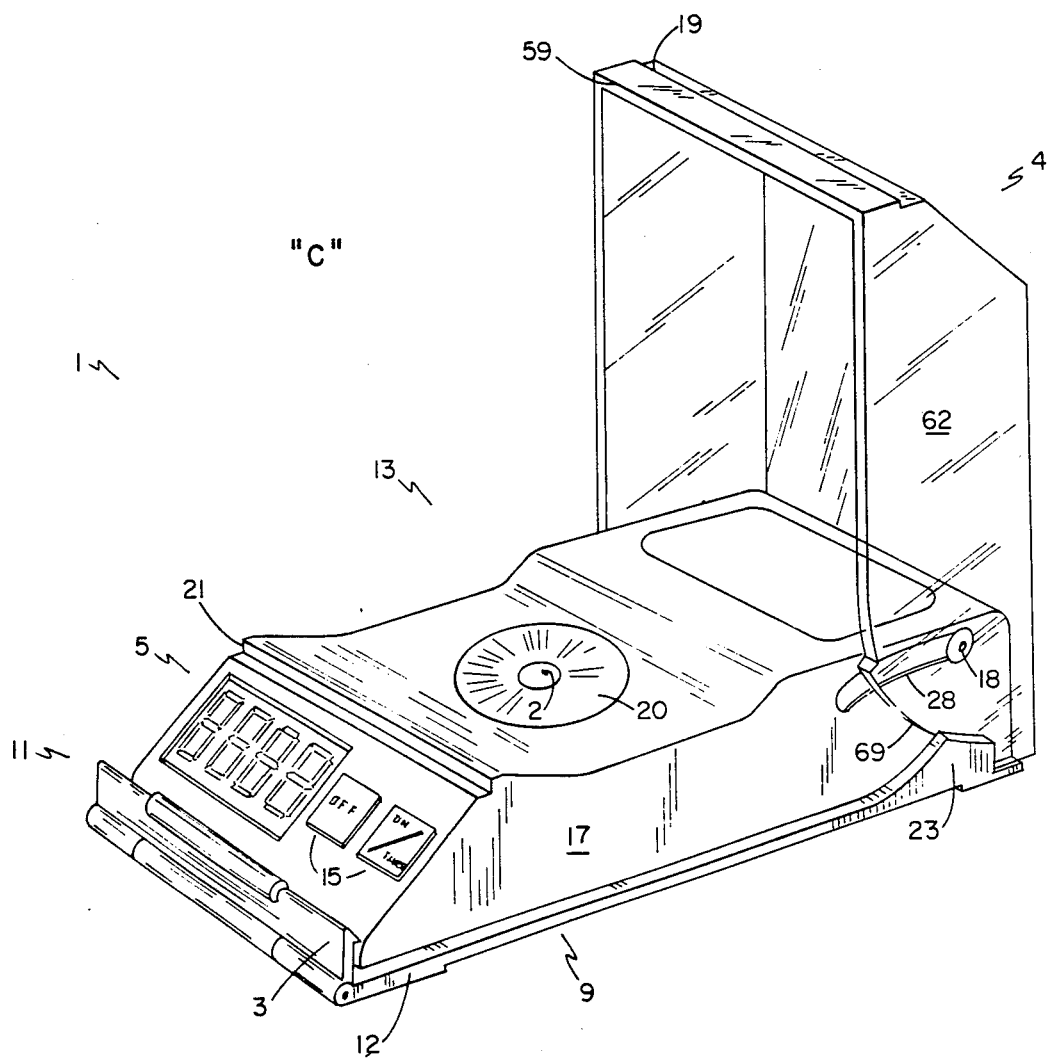
FIG. 7 shows a perspective view of the invention embodiment of FIG. 5 in the fully open position.
Figure 8A:
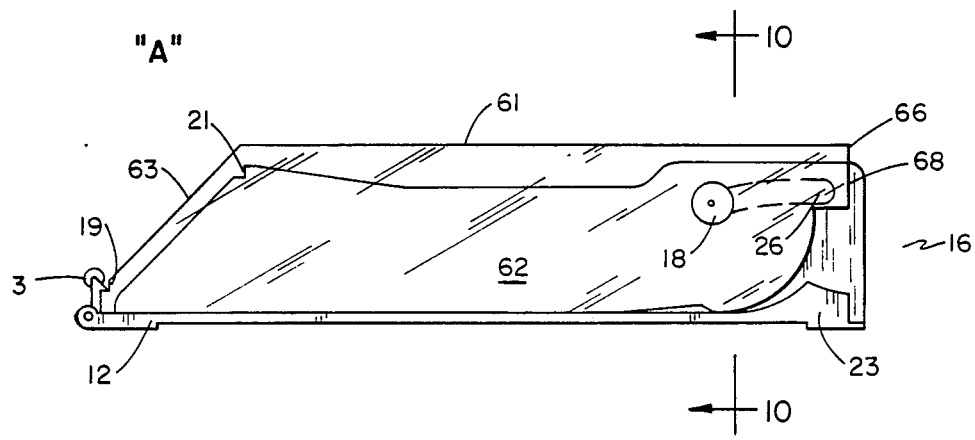
FIGS. 8A, 8B and 8C show elevational side views of the invention embodiments of FIGS. 5, 6 and 7.
Figure 8B:
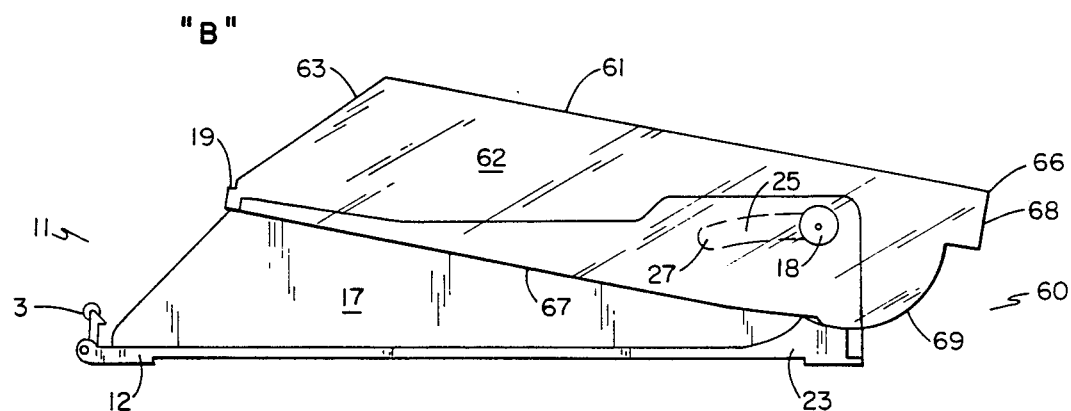
Figure 8C:
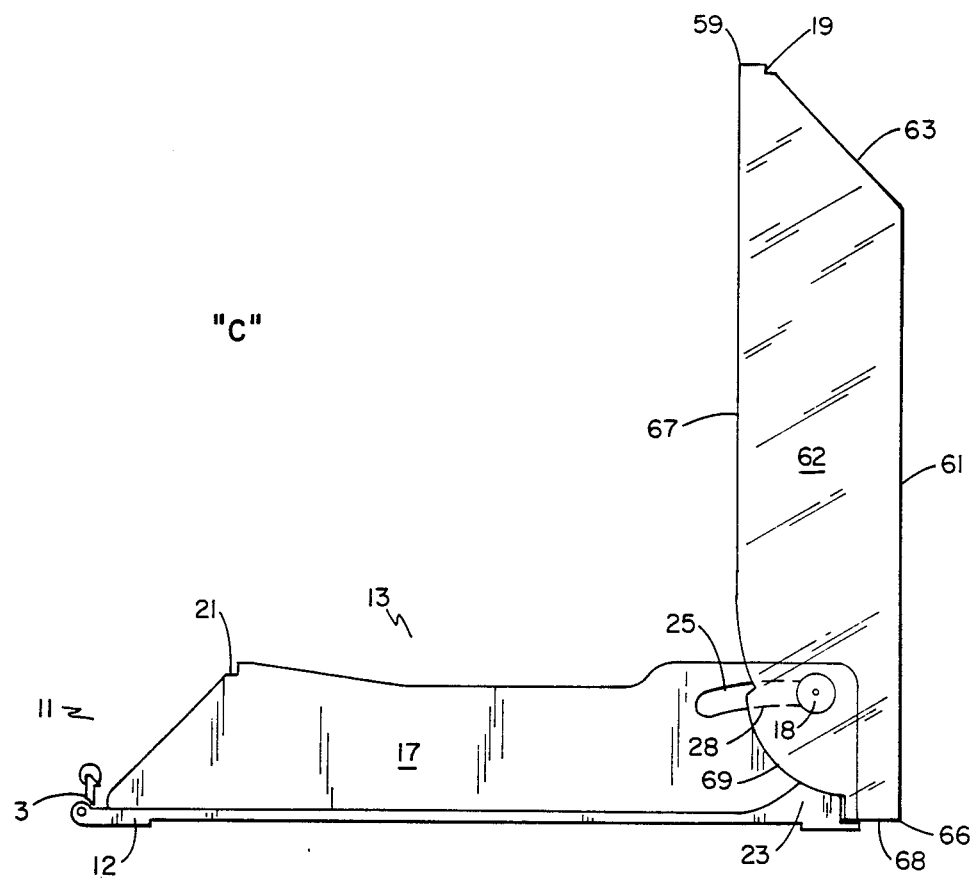
Figure 9:
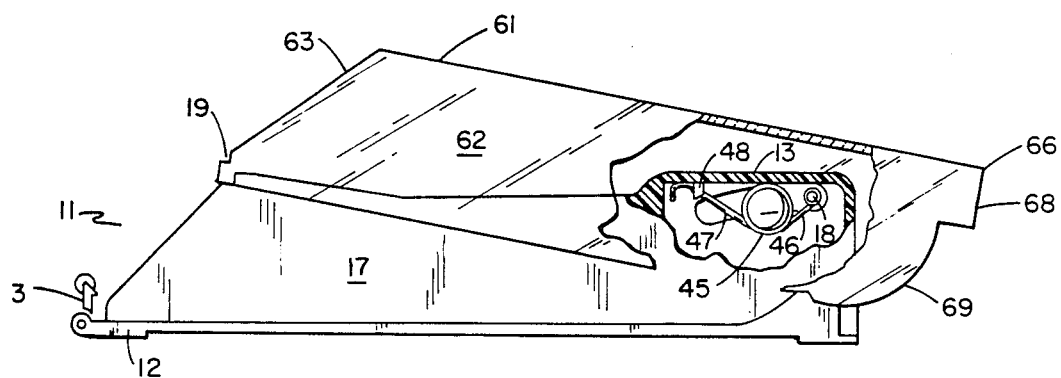
FIG. 9 shows a side view of FIG. 8B with the hinge section partially broken away for expository purposes.
Figure 10:
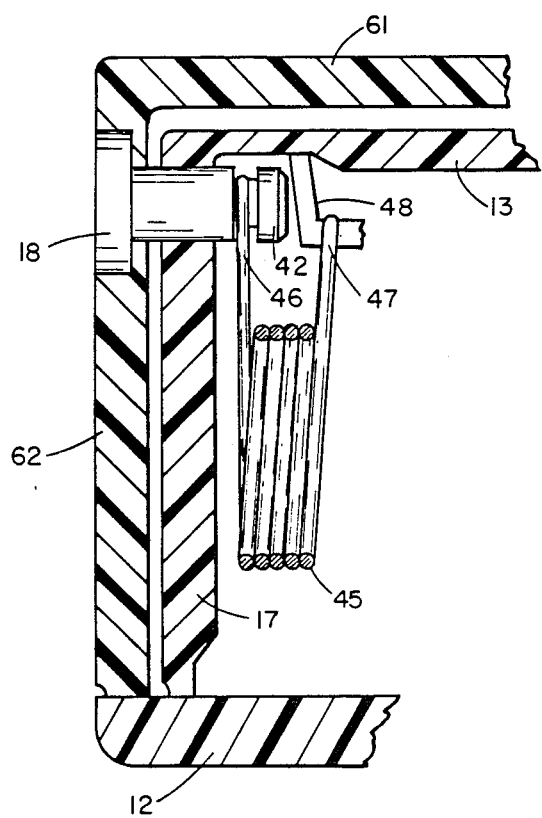
FIG. 10 is a sectional view along the plane defined by the line 10—10 in FIG. 8A.

The cover 4 in the embodiment illustrated in FIGS. 5-10 is a single piece cover which in its fully closed position A covers the casing top 13, casing front 11 and most of the casing sides 17. The cover 4 has a generally rectangular, planar top 61, two downwardly extending sides 62, and a front portion 63 extending downwardly and forwardly at an approximate forty-five degree angle. The sides 62 extend from the front portion 63 nearly to the casing rear 16. The rear edges 64 of the cover's sides 62 extend vertically downward 68 from the side end points 66 of the cover top's rear edge 65, and teen curvedly forward 69 to the bottom edges 67 of the cover's sides 62.

The cover 4 is hinged to the casing sides 17 by means of button posts 18 inserted through each of the cover's sides 62 toward the cover's rear 60. The posts 18 are inserted into the cover sides 62 at points approximately one-third of the vertical distance from the cover's top 61 to the bottom side edge 67 and approximately over the point where the cover side's rear curved edge portion 69 meets the cover side's bottom edge 67. Each button post 18 protrudes through a generally arc-shaped slot 25 in each of the casing sides 17. The arc-shaped slots 26 are horizontally positioned nearly at the casing rear 16 adjacent to the vertical portion 68 of the cover's rear side edges 64 and have their concave sides 28 facing downward. As can most clearly be seen in FIGS. 9 and 10, the innermost portion 42 of the button post 18 is grasped by one end 46 of a spiral spring 45. The other end 47 of the spring 45 is attached to a member 48 fixedly attached to the inside of the casing top 13. The action of the spring 45 is to push the button posts 18 rearward.

When the cover 4 is in the fully closed position A, the button posts 18 are each positioned at the forward end 27 of the arc-shaped slot 25. The display 5, keyboard 15 and weighing pan 20 are enclosed by the cover 4. The cover 4 is held in the fully closed position A by means of a spring latch 3 pivotally attached to the casing bottom 12 at the casing front 11. The latch 3 hooks onto a horizontal notch 19 in the cover's front portion 63.

To move the cover 4 into its intermediate position B, the spring latch 3 is moved forward thereby releasing the cover 4 and allowing the spiral springs 45 to act upon the button posts 18 pushing them back to the arc-shaped slot's rearward end 26. This causes the cover 4 to also slide rearward with the cover's front portion 63 sliding upward over the casing front 11. The bottom edge 59 of the cover's front 63 comes to rest at a horizontal notch 21 at the junction of the casing top 13 and casing front 11 above the display 5 and keyboard 15. This notch 21 also prevents the cover 4 from sliding any further back. When the cover 4 is in the intermediate position B, the weighing pan 20 is enclosed by the cover 4, and the LCD display 5 and keyboard 15 are fully exposed. The cover 4 thereby becomes an air screen and isolates the weighing operation from ambient air movement which could distort the calculated weight of the mass 2 being weighed.

When the cover 4 is in the fully open position C, the weighing pan 20, LCD display 5 and keyboard 15 are fully exposed to the ambient air. To attain this position, the cover 4 is pivoted upward from the intermediate position B to a vertical position. Two shaped ridges 23 each positioned rearwardly on a casing side 17 provides friction along the cover's rear side edge portions 69 so that the cover 4 holds the vertical position and does not flop down into the intermediate position B'.

It is understood that the above described embodiments are merely illustrative of the application. Other embodiments may be readily devised by those skilled in the art which will embody the principles of the invention and fall within the spirit and scope of the invention thereof.

I claim:

1. A dust cover used in combination with an electronic balance whereby the cover converts to an air screen during weighing operations, comprising:
    a rearward section having a top and sides and pivotally connected to said balance; and
    a forward section with a top, front and sides and pivotally connected to the rearward section.

2. A dust cover in accordance with claim 1 wherein:
    the rearward section has a flat, generally rectangular face, pivotally connected along its back edge to the balance and pivotally connected along its front edge to said forward section.

3. A dust cover in accordance with claim 2 wherein:
    the rearward section's face's side edges have downwardly protruding triangularly shaped sides.

4. A dust cover in accordance with claim 3 wherein:
    the forward section is made up of a flat, generally rectangular top face pivotally connected along its back edge to the front edge of the rearward section's face, and a front portion forwardly and downwardly extending from the front edge of said top face across the front of the balance.

5. A dust cover in accordance with claim 4 wherein: the forward section has two downwardly extending sides.

6. A dust cover in accordance with claim 5 wherein: the top edges of the sides are the side edges of the top face, the forward edges of the sides are the side edges of the front portion, and the back edges of the sides form a forty-five degree angle with the pivotal connection between the forward section and the rearward section.

7. A dust cover in accordance with claim 6 wherein: the rearward section's sides are formed into right triangles, whereby the hypotenuse of each side begins at the pivotal connection between the forward section and the rearward section and extends downwardly and rearwardly to a point below the pivotal connection to said balance.

8. A dust cover in accordance with claim 7 wherein: the rearward section's side hypotenuse edges and the back edges of the forward section's sides form a ninety degree angle at the pivotal connection between the forward section and the rearward section.

* * * * *